(12) United States Patent
Umeno (10) Patent No.: US 7,317,763 B2
(45) Date of Patent: Jan. 8, 2008

(54) PULSE GENERATOR, PULSE GENERATING METHOD, COMMUNICATING APPARATUS, AND COMMUNICATING METHOD

(75) Inventor: Ken Umeno, Tokyo (JP)

(73) Assignee: National Institute of Information and Communications Technology, Tokyo (JP)

(*) Notice: Subject to any disclaimer, the term of this patent is extended or adjusted under 35 U.S.C. 154(b) by 791 days.

(21) Appl. No.: 10/871,161

(22) Filed: Jun. 18, 2004

(65) Prior Publication Data

US 2004/0257205 A1    Dec. 23, 2004

(30) Foreign Application Priority Data

Jun. 20, 2003    (JP)    ............... P2003-177198

(51) Int. Cl.
*H04L 27/00*    (2006.01)
(52) U.S. Cl. ....................... 375/295; 375/260
(58) Field of Classification Search ........... 375/295, 375/286, 259, 260, 214
See application file for complete search history.

(56) References Cited

FOREIGN PATENT DOCUMENTS

| JP | 2001-060937 | 3/2001 |
|---|---|---|
| JP | 2003-140885 | 5/2003 |

*Primary Examiner*—Emmanuel Bayard
(74) *Attorney, Agent, or Firm*—Bell, Boyd & Lloyd LLP (57) ABSTRACT

A UWB wireless communicating system is provided. When a process of the system is started, an initial value $x_0$ is set to a storing portion. An output of the storing portion is supplied to a mapping portion that performs a calculation using a P-th order Chebyshev polynomial as a map. In addition, the output of the storing portion is returned to the storing portion. A generated chaotic sequence is stored in a pulse interval converting portion. The pulse interval converting portion converts a linear sum $G_1(x)$ of the Chebyshev polynomial into a pulse interval value t. An output of the pulse interval converting portion is supplied to a pulse output portion. A pulse sequence having a pulse interval $t_i$ into which the value of a liner sum $G_1(x_i)$ has been converted is output. The output pulse sequence is supplied to the UWB wireless communicating system.

26 Claims, 6 Drawing Sheets

*Fig. 6D*

PULSE GENERATOR, PULSE GENERATING METHOD, COMMUNICATING APPARATUS, AND COMMUNICATING METHOD

CROSS REFERENCES TO RELATED APPLICATIONS

This application claims priority to Japanese Patent Application No. P2003-177198 filed on Jun. 20, 2003, the disclosure of which is incorporated by reference herein.

BACKGROUND OF THE INVENTION

The present invention relates to a pulse generator, a pulse generating method, a communicating apparatus, and a communicating method applied to the ultra wideband (UWB) wireless communicating system.

Recently, as one wireless communicating system, the UWB wireless communicating system is becoming attractive. The UWB system not only uses an ultra wideband, but very short pulses on the order of nanoseconds or less (around several hundred picoseconds). The positions or amplitudes of pulses are modulated with transmission data. The UWB system allows a high transmission rate to be accomplished with a low power consumption.

In the UWB system, the transmission side modulates the positions or amplitudes of pulses of a pulse sequence that is output from a pulse generator with data to be transmitted so as to form a transmission signal. On the other hand, the reception side multiplies a reception signal by the same pulse sequence that was used on the transmission side so as to obtain reception data. When different pulse sequences are used by individual users to module and demodulate data, multiple access communications can be performed. The present invention uses a chaotic sequence for a UWB pulse generator. For example, Japanese Patent Laid-Open Publication No. 2003-140885 discloses a technology for digitally generating a chaotic sequence.

Another related art reference discloses a technology for accomplishing a spread spectrum communicating system for example CDMA communication system using a chaotic sequence. See, Japanese Patent No. 3234202.

However, the above-referenced cited art does not disclose the use of a chaotic sequence for the UWB system. In addition, the cited art does not describe a multiple access communication using a chaotic sequence for the UWB system.

SUMMARY OF THE INVENTION

The present invention relates to a pulse generator, a pulse generating method, a communicating apparatus, and a communicating method suitably applied to the UWB system.

In an embodiment, the present invention includes a pulse generator for generating pulses whose pulse intervals are controlled at random with a chaotic sequence, the pulse generator comprising a storing portion in which an initial value is set; a mapping portion for mapping a value that is output from the storing portion with a map of a Chebyshev polynomial; a converting portion for converting an output of the mapping portion into pulse interval values; and a pulse output portion for outputting a pulse sequence having the pulse interval values. In another embodiment, the present invention includes a pulse generating method for generating pulses whose pulse intervals are controlled at random with a chaotic sequence, the pulse generating method comprising the steps of setting an initial value to a storing portion; mapping a value that is output from the storing portion with a map of a Chebyshev polynomial; converting an output generated at the mapping step into pulse interval values; and outputting a pulse sequence having the pulse interval values.

In yet another embodiment, the present invention includes a pulse generator for generating pulses whose pulse amplitudes are controlled at random with a chaotic sequence, the pulse generator comprising a storing portion in which an initial value is set; a mapping portion for mapping a value that is output from the storing portion with a map of a Chebyshev polynomial; a converting portion for converting an output of the mapping portion into pulse amplitude values; and a pulse output portion for outputting a pulse sequence having the pulse amplitude values. In still yet another embodiment, the present invention includes a pulse generating method for generating pulses whose pulse amplitudes are controlled at random with a chaotic sequence, the pulse generating method comprising the steps of setting an initial value to a storing portion; mapping a value that is output from the storing portion with a map of a Chebyshev polynomial; converting an output generated at the mapping step into pulse amplitude values; and outputting a pulse sequence having the pulse amplitude values.

In a further embodiment, the present invention includes a pulse generator for generating pulses whose pulse intervals and pulse amplitudes are controlled at random with two chaotic sequences, the pulse generator comprising a storing portion in which two initial values are set; a mapping portion for mapping values that are output from the storing portion with same or different chaotic maps; a converting portion for converting two outputs generated by the mapping portion into pulse interval values and pulse amplitude values, respectively; and a pulse output portion for outputting a pulse sequence having the pulse interval values and the pulse amplitude values. In yet a further embodiment, the present invention includes a pulse generating method for generating pulses whose pulse intervals and pulse amplitudes are controlled at random with two chaotic sequences, the pulse generating method comprising the steps of setting two initial values to a storing portion; mapping values that are output from the storing portion with same or different chaotic maps; converting two outputs generated at the mapping step into pulse interval values and pulse amplitude values, respectively; and outputting a pulse sequence having the pulse interval values and the pulse amplitude values.

In still yet a further embodiment, the present invention includes an ultra wideband wireless communicating system for modulating positions of pulses of a pulse sequence with transmission data, the pulse sequence being generated by a pulse generator, the pulse generator comprising a storing portion in which an initial value is set; a mapping portion for mapping a value that is output from the storing portion with a map of a Chebyshev polynomial; a converting portion for converting an output of the mapping portion into pulse interval values; and a pulse output portion for outputting a pulse sequence having the pulse interval values. In an embodiment, the present invention includes an ultra wideband wireless communicating method for modulating positions of pulses of a pulse sequence with transmission data, the pulse sequence being generated by a pulse generating method, the pulse generating method comprising the steps of setting an initial value to a storing portion; mapping a value that is output from the storing portion with a map of a Chebyshev polynomial; converting an output generated at the mapping step into pulse interval values; and outputting a pulse sequence having the pulse interval values.

In an embodiment, the present invention includes an ultra wideband wireless communicating system for modulating amplitudes of pulses of a pulse sequence with transmission data, the pulse sequence being generated by a pulse generator, the pulse generator comprising a storing portion in which an initial value is set; a mapping portion for mapping a value that is output from the storing portion with a map of a Chebyshev polynomial; a converting portion for converting an output of the mapping portion into pulse amplitude values; and a pulse output portion for outputting a pulse sequence having the pulse amplitude values. In an embodiment, the present invention is an ultra wideband wireless communicating method for modulating amplitudes of pulses of a pulse sequence with transmission data, the pulse sequence being generated by a pulse generating method, the pulse generating method comprising the steps of setting an initial value to a storing portion; mapping a value that is output from the storing portion with a map of a Chebyshev polynomial; converting an output generated at the mapping step into pulse amplitude values; and outputting a pulse sequence having the pulse amplitude values.

In an embodiment, the present invention is an ultra wideband wireless communicating apparatus for modulating positions and amplitudes of pulses of a pulse sequence with transmission data, the pulse sequence being generated by a pulse generator, the pulse generator comprising a storing portion in which two initial values are set; a mapping portion for mapping values that are output from the storing portion with same or different chaotic maps; a converting portion for converting outputs of the mapping portion into pulse interval values and pulse amplitude values; and a pulse output portion for outputting a pulse sequence having the pulse interval values and the pulse amplitude values. In an embodiment, the present invention includes an ultra wideband wireless communicating method for modulating positions and amplitudes of pulses of a pulse sequence with transmission data, the pulse sequence being generated by a pulse generating method, the pulse generating method comprising the steps of setting two initial values to a storing portion; mapping values that are output from the storing portion with same or different chaotic maps; converting outputs generated at the mapping step into pulse interval values and pulse amplitude values, respectively; and outputting a pulse sequence having the pulse interval values and the pulse amplitude values.

According to an embodiment of the present invention, a pulse sequence of which at least one of pulse interval values and pulse amplitude values is controlled with a chaotic sequence is generated. At least one of the pulse intervals and the pulse amplitudes of the generated pulse sequence is controlled with transmission data. Thus, a UWB communication having high randomness can be accomplished.

Additional features and advantages of the present invention are described in, and will be apparent from, the following Detailed Description of the Invention and the figures.

DETAILED DESCRIPTION OF THE INVENTION

The present invention relates to a pulse generator, a pulse generating method, a communicating apparatus, and a communicating method applied to the ultra wideband (UWB) wireless communicating system.

Figure 1:
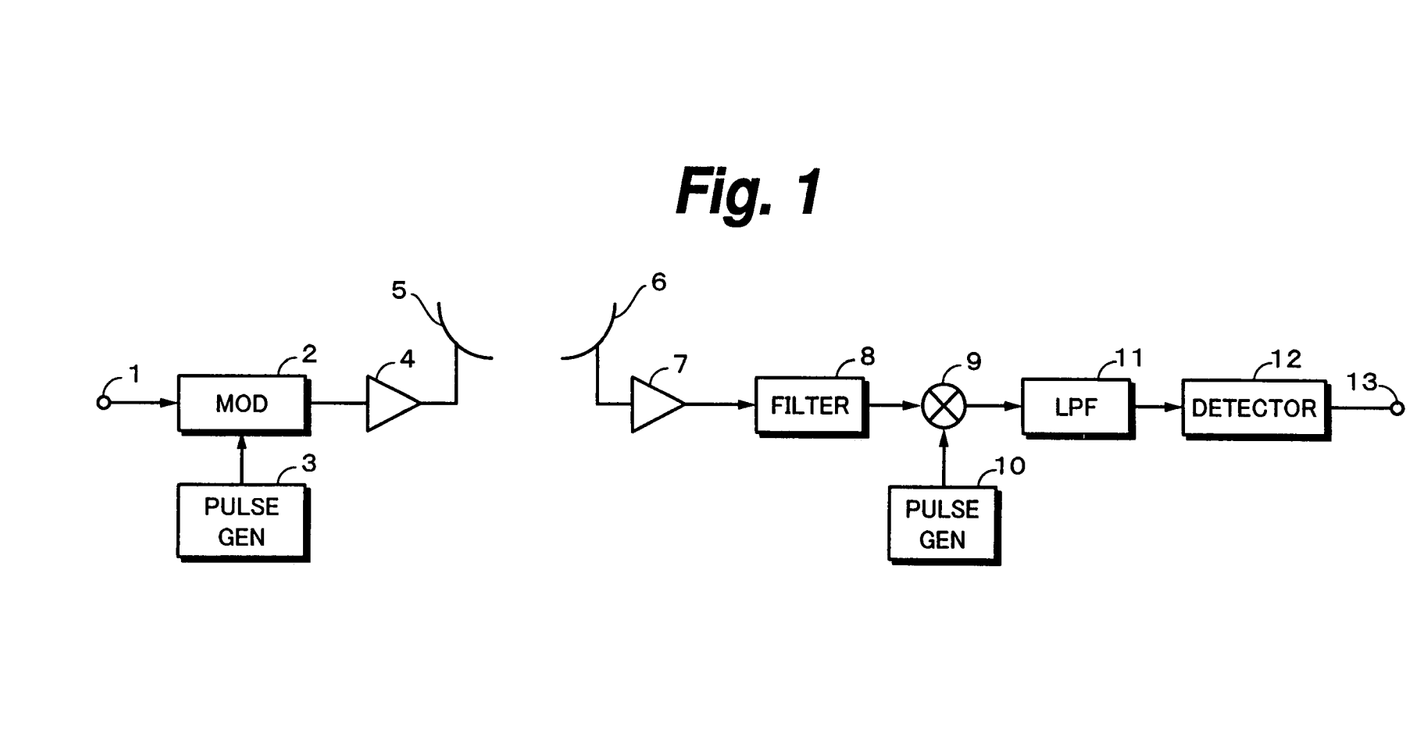
FIG. 1 is a block diagram showing a UWB wireless communicating system according to an embodiment of the present invention.

Next, with reference to the accompanying drawings, an embodiment of the present invention will be described. With respect to reference to FIG. 1, a UWB wireless communicating system will be described. In FIG. 1, reference numeral 1 represents an input terminal of a data sequence to be transmitted (referred to as transmission data). The transmission data is supplied to a modulator 2. A pulse sequence having a very short pulse width is supplied from a pulse generator 3 to the modulator 2. The modulator 2 modulates the positions or amplitudes of pulses received from the pulse generator 3 with the transmission data. When necessary, an output signal of the modulator 2 is supplied to an antenna 5 through an amplifier 4. A radio wave is transmitted from the antenna 5.

When necessary, a reception signal received by a receiving antenna 6 is supplied to a filter 8 through a low noise amplifier (LNA) 7. The filter 8 causes a predetermined frequency band of the reception signal to selectively pass. An output signal of the filter 8 is supplied to a multiplying device 9. A pulse sequence is supplied from a pulse generator 10 to the multiplying device 9. An output signal of the multiplying device 9 is supplied to a detector 12 through a low pass filter 11 that removes an unnecessary signal component from the signal. The detector 12 converts a pulse position or a pulse amplitude into one of data "0" and "1". Reception data is obtained from an output terminal 13 of the detector 12.

The multiplying device 9, the pulse generator 10, the low pass filter 11, and the detector 12 compose a demodulator. A pulse sequence that is input to the multiplying device 9 is the same as a pulse sequence that is used for modulation on the transmission side.

The present invention is applied to the pulse generator 3 or 10 of the foregoing UWB wireless communicating system. According to the present invention, the pulse generator 3 or 10 that outputs a pulse sequence whose pulse interval or pulse amplitude is controlled with a chaotic sequence is accomplished.

A chaotic sequence is generated by a chaotic map using a Chebyshev polynomial. The following Chebyshev polynomial is defined by the following formula (1).

$$T_p(\cos\theta) = \cos(p\theta) \qquad (1)$$

By using the Chebyshev polynomial as a map, a spread code sequence is obtained. When p=2, Tp(x) is given as follows.

$$T_2(x) = 2x^2 - 1 \qquad (2)$$

A map necessary for obtaining a spread code sequence is given by the following formula (3).

$$x_{n+1}=2x_n^2-1 \quad (3)$$

In the general case P ($\geq 2$), the following formula is satisfied.

$$x_{n+1}=T_p(x_n) \quad (4)$$

A sequence obtained by such a map has an excellent correlation characteristic over a Gold code sequence used in a conventional CDMA system. The Gold code sequence is obtained by exclusively ORing two different M sequences with an exclusive OR gate.

Figure 2:
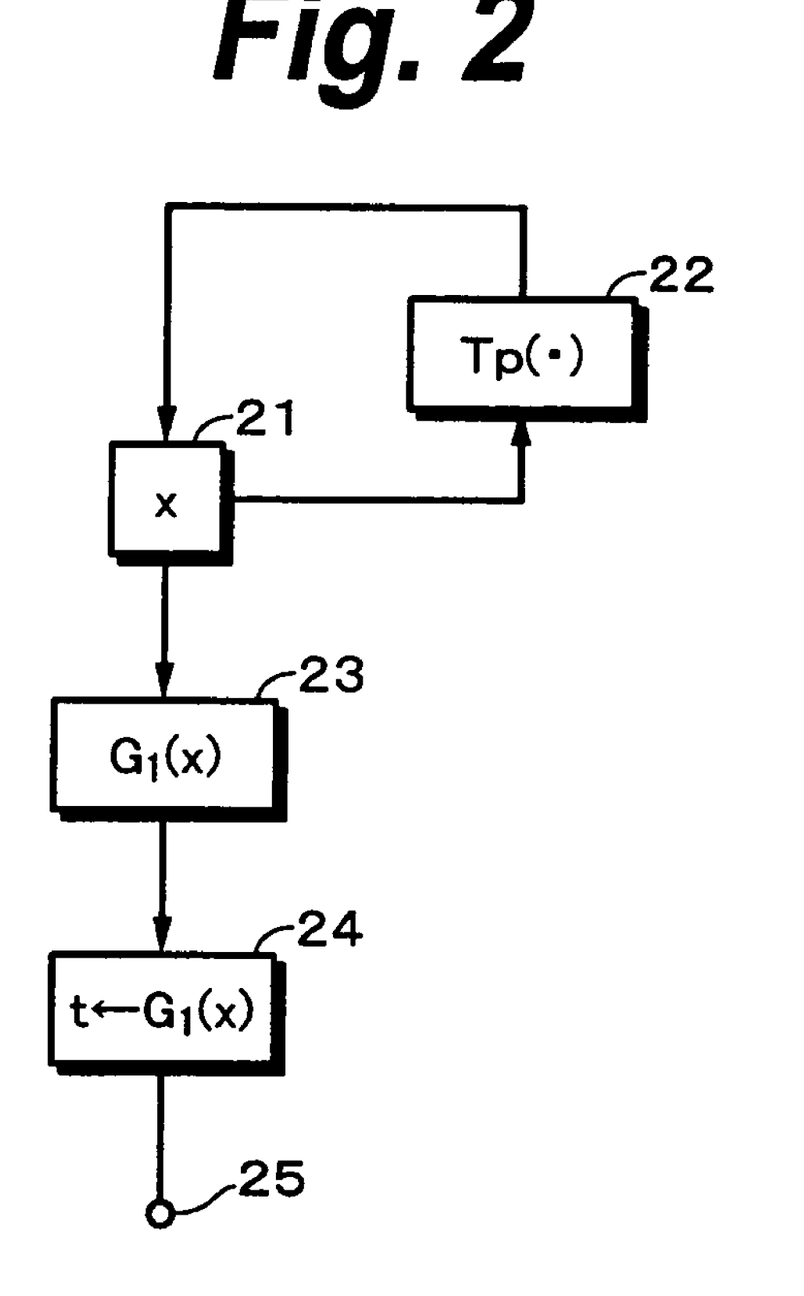
FIG. 2 is a block diagram showing a chaotic sequence generator according to an embodiment of the present invention.

FIG. 2 shows a pulse generator according to an embodiment of the present invention. Reference numeral 21 represents a storing portion such as a register. When a process is started, an initial value $x_0$ is set to the storing portion 21. Reference numeral 22 represents a mapping portion that performs a calculation of the formula (4) with a P-th order Chebyshev polynomial. An output of the storing portion 21 is supplied to the mapping portion 22. In addition, the output of the mapping portion 22 is returned to the storing portion 21. As a result, the calculation expressed by the formula (3) is performed. The sequence $x_i$ generated in such a manner is a chaotic sequence. When the initial value $x_0$ or the order is varied, a different chaotic sequence is generated.

It is necessary for the mapping portion 22 to perform a calculation of a Chebyshev polynomial having P-th order (where P is two or more). Alternatively, a control signal (not shown) that designates the order of the Chebyshev polynomial may be input to the mapping portion 22 so as to designate a predetermined order of the Chebyshev polynomial. The Chebyshev map can be expressed as polynomials.

$$T_0(x)=1$$

$$T_1(x)=x$$

$$T_2(x)=2x^2-1$$

$$T_3(x)=4x^3-3x$$

A Chebyshev polynomial $y=T_i(x)$ is a rational map of which a closed interval $-1 \leq x \leq 1$ is mapped to a closed interval $-1 \leq y \leq 1$.

An output of the mapping portion 22 is stored in a pulse interval converting portion 23. The pulse interval converting portion 23 maps an output value of the mapping portion 22 with a plurality of Chebyshev polynomials and generates their linear sums as pulse interval values. A content $G_1(x)$ of the pulse interval converting portion 23 is a linear sum of the following Chebyshev polynomial given by formula (5). In the formula (5), $\Sigma$ represents a linear sum from i=0 to i=$M_1$. The pulse interval converting portion 23 converts $G_1(x)$ into a pulse interval value t. The pulse interval converting portion 23 may be composed of for example a mapping table.

$$G_1(x)=\Sigma a_i T_i(x) \quad (5)$$

Pulse interval values that are output from the pulse interval converting portion 23 are supplied to a pulse output portion 24. The pulse output portion 24 outputs a pulse sequence having a pulse interval $t_i$ corresponding to the pulse interval value. Values $x_i$ of a chaotic sequence are generated at time intervals of a clock of a digital circuit that composes for example the storing portion 21, the pulse interval converting portion 23, and the pulse output portion 24. The hardware may be structured optically instead of electrically. A pulse sequence is obtained from an output terminal 25 of the pulse output portion 24. The output pulse sequence is supplied to the modulator 2 or the multiplying device 9 of the UWB wireless communicating system shown in FIG. 1.

Figure 3A:
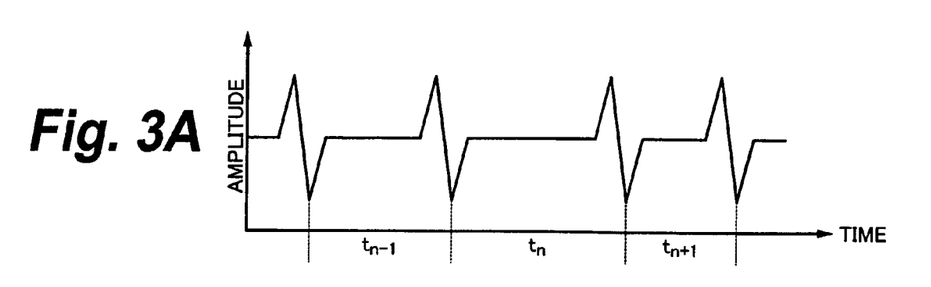
FIG. 3A and FIG. 3B are schematic diagrams showing an output of the chaotic sequence generator according to the embodiment of the present invention.

FIG. 3A shows an example of an output pulse sequence obtained from the output terminal 25. Intervals $t_{n-1}$, $t_n$, and $t_{n+1}$ of adjacent pulses on time base are values of chaotic sequences. A chaotic sequence has excellent randomness, and so has a pulse interval converted therefrom.

Figure 3B:
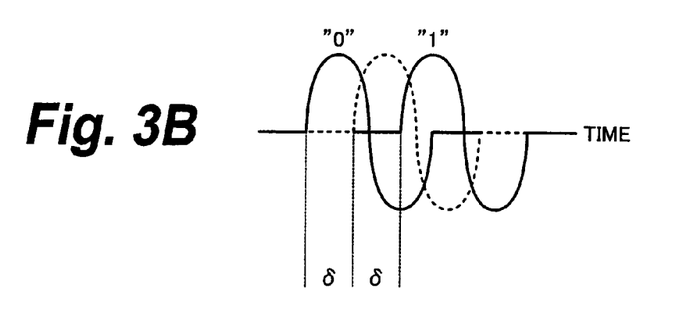

In the UWB wireless communicating system, as shown in FIG. 3B, pulse positions of pulses in a pulse sequence are modulated with "0" and "1" of transmission data. In FIG. 3B, a pulse position represented by a dotted line is a reference position designated by pulses whose pulse interval is controlled with a chaotic sequence. When one bit of transmission data is "0", it is modulated with a pulse position that deviates forwardly from the reference position by $\delta$. When one bit of transmission data is "1", it is modulated with a pulse position that deviates backwardly from the reference position by $\delta$.

Figure 4:
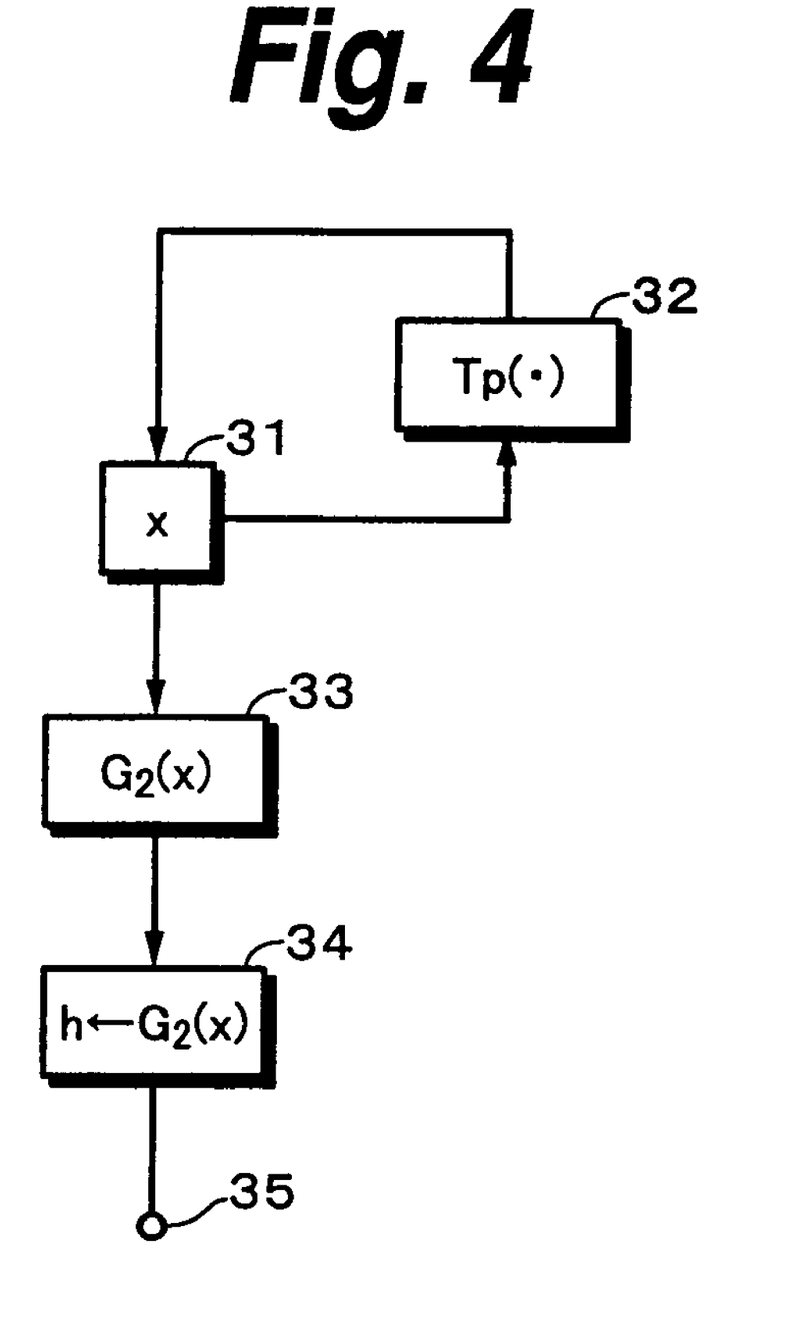
FIG. 4 is a block diagram showing a chaotic sequence generator according to another embodiment of the present invention.

FIG. 4 shows a pulse generator according to another embodiment of the present invention. In FIG. 4, reference numeral 31 represents a storing portion such as a register. When the process of the pulse generator is started, an initial value x0 is set to the storing portion 31. Reference numeral 32 represents a mapping portion that calculates the formula (4) using a Chebyshev polynomial having a P-th order as a map. An output of the storing portion 31 is supplied to the mapping portion 32. In addition, an output of the mapping portion 32 is returned to the storing portion 31. As a result, a chaotic sequence $x_i$ is generated.

The output of the mapping portion 32 is stored in a pulse amplitude converting portion 33. The pulse amplitude converting portion 33 maps the output value of the mapping portion 32 with a plurality of different Chebyshev polynomials and generates their linear sums as pulse amplitude values. A content $G_2(x)$ of the pulse amplitude converting portion 33 is a linear sum of a Chebyshev polynomial given by formula (6). In the formula (6), $\Sigma$ represents a linear sum from i=0 to i=$M_2$. The pulse amplitude converting portion 33 converts $G_2(x)$ into a pulse amplitude value h. Alternatively, the pulse amplitude converting portion 33 may be composed of for example a mapping table.

$$G_2(x)=\Sigma b_i T_i(x) \quad (6)$$

A pulse amplitude value that is output from the pulse amplitude converting portion 33 is supplied to a pulse output portion 34. The pulse output portion 34 outputs a pulse sequence having a pulse amplitude $h_i$ corresponding to the pulse amplitude value. Values $x_i$ of a chaotic sequence are generated at time intervals of a clock of a digital circuit that composes for example the storing portion 31, the pulse amplitude converting portion 33, and the pulse output portion 34. The hardware may be structured optically instead of electrically. A pulse sequence is obtained from an output terminal 35 of the pulse output portion 34. The output pulse sequence is supplied to the modulator 2 or the multiplying device 9 of the UWB wireless communicating system shown in FIG. 1.

Figure 5A:
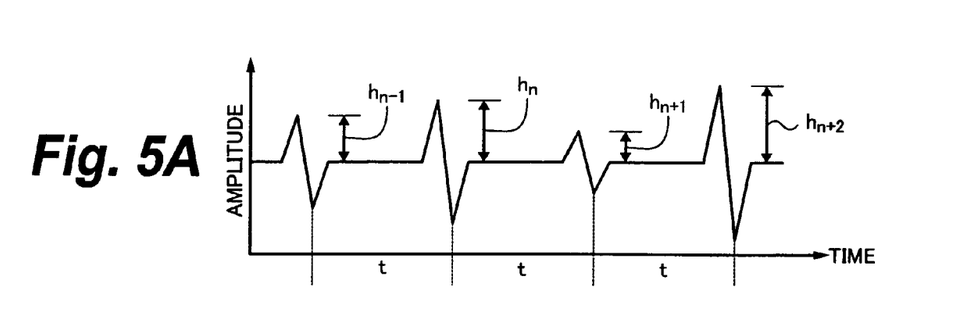
FIG. 5A and FIG. 5B are schematic diagrams showing an output of a chaotic sequence generator according to another embodiment of the present invention.

FIG. 5A shows an example of an output pulse sequence that is obtained from the output terminal 35. Intervals t of adjacent pulses on time base are constant. Amplitudes $h_{n-1}$, $h_n$, and $h_{n+1}$ of the pulses of the pulse sequence correspond to values of a chaotic sequence. A chaotic sequence has excellent randomness, and so has a pulse amplitude converted therefrom.

Figure 5B:
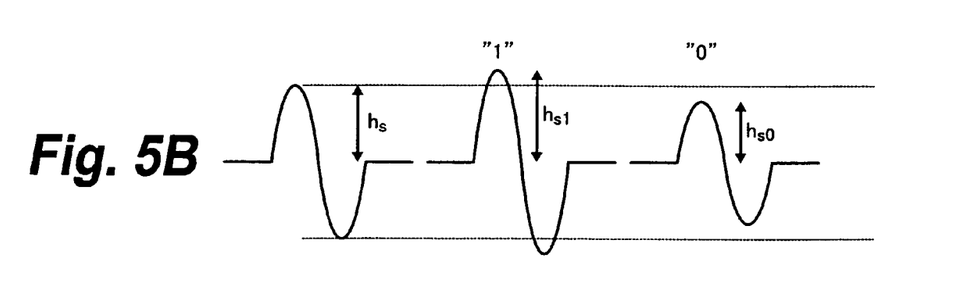

As shown in FIG. 5B, in the UWB wireless communicating system, pulse amplitudes are modulated with "0" and "1" of transmission data. In FIG. 5B, a pulse amplitude shown on the left side is an amplitude $h_s$ (namely, reference amplitude) of a pulse obtained from the output terminal 35. When one bit of transmission data is "1", a pulse obtained from the output terminal 35 has an amplitude $h_{s1}$ that is larger than the reference amplitude $h_s$ by a predetermined amount. When one bit of transmission data is "0", a pulse obtained from the output terminal 35 has an amplitude $h_{s0}$ that is smaller than the reference amplitude $h_s$ by a predetermined amount.

Next, a pulse generator according to another embodiment of the present invention will be described.

The pulse generator generates pulses whose pulse intervals and pulse amplitudes are controlled at random with two chaotic sequences. The pulse generator comprises a storing portion, a mapping portion, a converting portion, and a pulse output portion. The storing portion sets two initial values. The mapping portion maps output values of the storing portion with same or different chaotic maps. The converting portion converts outputs of the mapping portion into pulse interval values and pulse amplitude values. The pulse output portion outputs pulse sequences having the pulse interval values and the pulse amplitude values. The chaotic maps use the same or different Chebyshev polynomials.

Figure 6A:
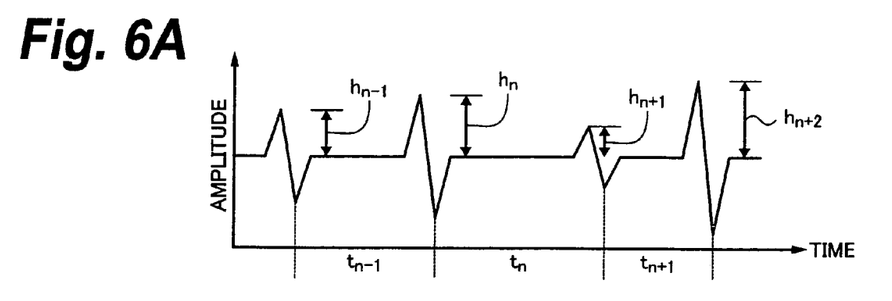
FIG. 6A, FIG. 6B, FIG. 6C, and FIG. 6D are schematic diagrams showing an output of a chaotic sequence generator according to another embodiment of the present invention.
Figure 6B:
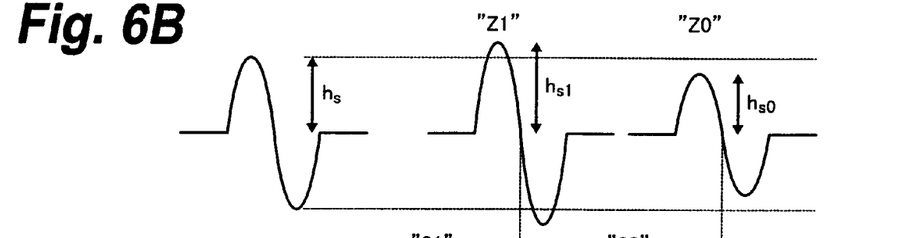
Figure 6C:
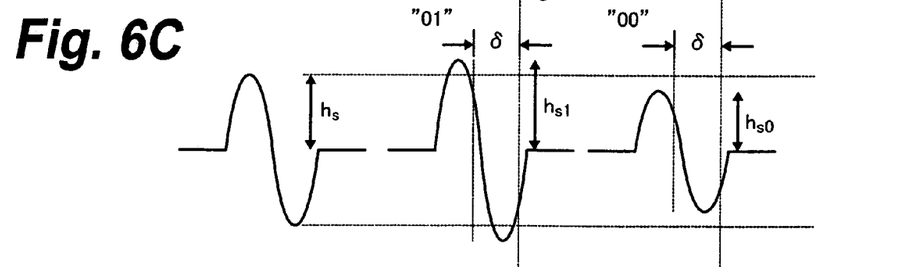
Figure 6D:
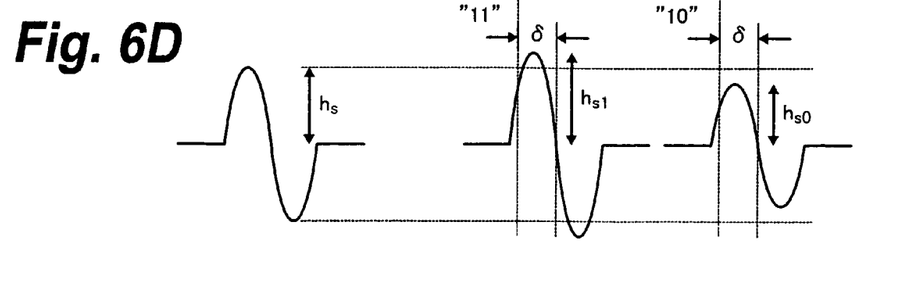

FIG. 6A shows a pulse sequence generated according to the other embodiment of the present invention. In other words, intervals of pulses in a pulse sequence are varied at random by one chaotic sequence. In addition, amplitudes of the pulses in the pulse sequence are varied at random by the other chaotic sequence. FIG. 6B, FIG. 6C, and FIG. 6D show an outline of a modulating method with data. FIG. 6B shows that data is modulated with only pulse amplitudes. A pulse amplitude $h_{s1}$ that is larger than a reference amplitude $h_s$ by a predetermined amount corresponds to two bits "Z1" of transmission data. A pulse amplitude $h_{s0}$ that is smaller than the reference amplitude $h_s$ by a predetermined amount corresponds to two bits "Z0" of transmission data. In this example, Z is "0" or "1".

When Z="0", as shown in FIG. 6C, the pulse position is shifted forwardly from a reference pulse position by δ. Thus, by a combination of the pulse position and the pulse amplitudes, two bits "01" and "00" are represented. When Z="1", as shown in FIG. 6D, the pulse position is shifted backwardly from the pulse position by δ. Thus, by a combination of the pulse position and the pulse amplitudes, two bits two bits "11" and "10" are represented. Consequently, with one pulse, two bits can be represented. As a result, the amount of transmission data and transmission rate can be increased.

The chaotic sequence generator that performs mapping expressed by the formula (4) is accomplished by a digital circuit. To reduce the circuit scale of the digital circuit, it is advantageous to perform fixed point arithmetic calculation rather than floating point arithmetic calculation. However, when mapping is performed by fixed point arithmetic calculation, short periodic solution or fixed point takes place.

To solve such a problem, a technology for generating a chaotic sequence using so-called bit harnessing has been proposed. According to the present invention, the bit harnessing may be used. In the bit harnessing method, the least significant bit (LSB) of a mapped result of a Chebyshev polynomial and a Gold code are supplied to an exclusive-OR gate so as to randomize the LSB. A method for randomizing the LSB with a random number sequence such as a Gold sequence is referred to as bit harnessing. When bit harnessing is performed, the period of an output sequence becomes longer several to several ten times than the case that the bit harnessing is not preformed. As a result, a more preferable chaotic sequence can be generated.

The foregoing chaotic sequence can be generated by software. In this case, the software comprises steps of inputting an initial value and storing the initial value to a storing portion; performing mapping with a Chebyshev map; performing a bit harnessing (randomizing a predetermined bit such as LSB) when necessary; feeding back the generated sequence to the storing portion; converting the generated sequence into a pulse interval value or a pulse amplitude value; and outputting a pulse sequence having the pulse interval value or pulse amplitude value. Alternatively, such a method may be stored as a program in a computer readable storing medium.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, when a pulse sequence generated with a chaotic sequence is varied for each user, a multiple access system can be accomplished. In this case, it is preferred that the absolute value of a normalized correlation coefficient of a chaotic sequence that identifies a different user should be for example 0.3 or less.

According to the present invention, a chaotic sequence is converted into a pulse interval value or a pulse amplitude value so as to generate a pulse sequence for a UWB wireless communicating system. As a result, data can be modulated with excellent randomness and a communication having excellent secrecy can be performed. Thus, a multiple access system can be accomplished.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A pulse generator for generating pulses having pulse intervals that are controlled at random with a chaotic sequence, the pulse generator comprising:
   a storing portion in which an initial value is set;
   a mapping portion for mapping a value that is output from the storing portion with a map of a Chebyshev polynomial;
   a converting portion for converting an output of the mapping portion into pulse interval values; and
   a pulse output portion for outputting a pulse sequence having the pulse interval values.

2. The pulse generator as set forth in claim 1, wherein the converting portion is configured to map the output values of the mapping portion with a plurality of different Chebyshev polynomials and generating their linear sums thereof as the pulse interval values.

3. A pulse generating method for generating pulses having pulse intervals that are controlled at random with a chaotic sequence, the pulse generating method comprising the steps of:
   setting an initial value to a storing portion;
   mapping a value that is output from the storing portion with a map of a Chebyshev polynomial;
   converting an output generated at the mapping step into pulse interval values; and outputting a pulse sequence having the pulse interval values.

4. The pulse generating method as set forth in claim 3, wherein the converting step is performed by mapping the output values at the mapping step with a plurality of different Chebyshev polynomials and generating their linear sums as the pulse interval values.

5. A pulse generator for generating pulses having pulse amplitudes that are controlled at random with a chaotic sequence, the pulse generator comprising:
   a storing portion in which an initial value is set;
   a mapping portion for mapping a value that is output from the storing portion with a map of a Chebyshev polynomial;
   a converting portion for converting an output of the mapping portion into pulse amplitude values; and
   a pulse output portion for outputting a pulse sequence having the pulse amplitude values.

6. The pulse generator as set forth in claim 5, wherein the converting portion is configured to map the output values of the mapping portion with a plurality of different Chebyshev polynomials and generating linear sums thereof as the pulse amplitude values.

7. A pulse generating method for generating pulses having pulse amplitudes that are controlled at random with a chaotic sequence, the pulse having method comprising the steps of:
   setting an initial value to a storing portion;
   mapping a value that is output from the storing portion with a map of a Chebyshev polynomial;
   converting an output generated at the mapping step into pulse amplitude values; and
   outputting a pulse sequence having the pulse amplitude values.

8. The pulse generating method as set forth in claim 7, wherein the converting step is performed by mapping the output values at the mapping step with a plurality of different Chebyshev polynomials and generating linear sums thereof as the pulse amplitude values.

9. A pulse generator for generating pulses having pulse intervals and pulse amplitudes that are controlled at random with two chaotic sequences, the pulse generator comprising:
   a storing portion in which two initial values are set;
   a mapping portion for mapping values that are output from the storing portion with same or different chaotic maps;
   a converting portion for converting two outputs generated by the mapping portion into pulse interval values and pulse amplitude values, respectively; and
   a pulse output portion for outputting a pulse sequence having the pulse interval values and the pulse amplitude values.

10. The pulse generator as set forth in claim 9, wherein the chaotic maps are same or different Chebyshev polynomials.

11. A pulse generating method for generating pulses having pulse intervals and pulse amplitudes that are controlled at random with two chaotic sequences, the pulse generating method comprising the steps of:
    setting two initial values to a storing portion;
    mapping values that are output from the storing portion with same or different chaotic maps;
    converting two outputs generated at the mapping step into pulse interval values and pulse amplitude values, respectively; and
    outputting a pulse sequence having the pulse interval values and the pulse amplitude values.

12. The pulse generating method as set forth in claim 11, wherein the chaotic maps are same or different Chebyshev polynomials.

13. An ultra wideband wireless communicating system for modulating positions of pulses of a pulse sequence with transmission data, the pulse sequence being generated by a pulse generator, the pulse generator comprising:
    a storing portion in which an initial value is set;
    a mapping portion for mapping a value that is output from the storing portion with a map of a Chebyshev polynomial;
    a converting portion for converting an output of the mapping portion into pulse interval values; and
    a pulse output portion for outputting a pulse sequence having the pulse interval values.

14. The communicating system as set forth in claim 13, wherein by varying the initial value, a different pulse sequence is generated, and
    wherein a user is identified by the pulse sequence.

15. An ultra wideband wireless communicating method for modulating positions of pulses of a pulse sequence with transmission data, the pulse sequence being generated by a pulse generating method, the pulse generating method comprising the steps of:
    setting an initial value to a storing portion;
    mapping a value that is output from the storing portion with a map of a Chebyshev polynomial;
    converting an output generated at the mapping step into pulse interval values; and
    outputting a pulse sequence having the pulse interval values.

16. The communicating method as set forth in claim 15, wherein by varying the initial value, a different pulse sequence is generated, and
    wherein a user is identified by the pulse sequence.

17. An ultra wideband wireless communicating system for modulating amplitudes of pulses of a pulse sequence with transmission data, the pulse sequence being generated by a pulse generator, the pulse generator comprising:
    a storing portion in which an initial value is set;
    a mapping portion for mapping a value that is output from the storing portion with a map of a Chebyshev polynomial;
    a converting portion for converting an output of the mapping portion into pulse amplitude values; and
    a pulse output portion for outputting a pulse sequence having the pulse amplitude values.

18. The communicating system as set forth in claim 17, wherein by varying the initial value, a different pulse sequence is generated, and
    wherein a user is identified by the pulse sequence.

19. An ultra wideband wireless communicating method for modulating amplitudes of pulses of a pulse sequence with transmission data, the pulse sequence being generated by a pulse generating method, the pulse generating method comprising the steps of:
    setting an initial value to a storing portion;
    mapping a value that is output from the storing portion with a map of a Chebyshev polynomial;
    converting an output generated at the mapping step into pulse amplitude values; and
    outputting a pulse sequence having the pulse amplitude values.

20. The communicating method as set forth in claim 19, wherein by varying the initial value, a different pulse sequence is generated, and
    wherein a user is identified by the pulse sequence.

21. An ultra wideband wireless communicating apparatus for modulating positions and amplitudes of pulses of a pulse sequence with transmission data, the pulse sequence being generated by a pulse generator, the pulse generator comprising:
- a storing portion in which two initial values are set;
- a mapping portion for mapping values that are output from the storing portion with same or different chaotic maps;
- a converting portion for converting outputs of the mapping portion into pulse interval values and pulse amplitude values; and
- a pulse output portion for outputting a pulse sequence having the pulse interval values and the pulse amplitude values.

22. The communicating apparatus as set forth in claim 21, wherein the chaotic maps are same or different Chebyshev polynomials.

23. The communicating apparatus as set forth in claim 21, wherein by varying the initial value, a different pulse sequence is generated, and
wherein a user is identified by the pulse sequence.

24. An ultra wideband wireless communicating method for modulating positions and amplitudes of pulses of a pulse sequence with transmission data, the pulse sequence being generated by a pulse generating method, the pulse generating method comprising the steps of:
- setting two initial values to a storing portion;
- mapping values that are output from the storing portion with same or different chaotic maps;
- converting outputs generated at the mapping step into pulse interval values and pulse amplitude values, respectively; and
- outputting a pulse sequence having the pulse interval values and the pulse amplitude values.

25. The communicating method as set forth in claim 24, wherein the chaotic maps are same or different Chebyshev polynomials.

26. The communicating method as set forth in claim 24, wherein by varying the initial value, a different pulse sequence is generated, and
wherein a user is identified by the pulse sequence.

* * * * *